United States Patent [19]
Cuthbertson et al.

[11] Patent Number: 5,724,597
[45] Date of Patent: Mar. 3, 1998

[54] METHOD AND SYSTEM FOR MATCHING NAMES AND ADDRESSES

[75] Inventors: Robert John Cuthbertson; Jianhua Zhu, both of Lafayette; Rodolphe J. Nassif, Louisville; Patrick Pfeffer, Lafayette; Srdjan N. Kovacevic, Westminster, all of Colo.

[73] Assignee: U S West Technologies, Inc., Boulder, Colo.

[21] Appl. No.: 282,945

[22] Filed: Jul. 29, 1994

[51] Int. Cl.⁶ .................................................. G06F 17/21
[52] U.S. Cl. ........................................... 395/793; 395/792
[58] Field of Search .......................... 364/419.1, 419.17, 364/419.06, 419.07; 395/145, 600, 650, 601, 606, 792, 793, 761, 778

[56] References Cited

U.S. PATENT DOCUMENTS

| | | | |
|---|---|---|---|
| 4,450,520 | 5/1984 | Hollaar et al. | 364/200 |
| 4,797,855 | 1/1989 | Duncan, IV et al. | 400/63 |
| 4,817,129 | 3/1989 | Riskin | 379/88 |
| 4,853,882 | 8/1989 | Marshall | 364/570 |
| 4,868,750 | 9/1989 | Kucera et al. | 364/419 |
| 4,885,580 | 12/1989 | Noto et al. | 364/709.01 |
| 5,224,038 | 6/1993 | Bespalko | 364/419 |
| 5,255,310 | 10/1993 | Kim et al. | 379/88 |
| 5,333,317 | 7/1994 | Dann | 395/600 |
| 5,454,063 | 9/1995 | Rossideo | 395/2.84 |
| 5,465,353 | 11/1995 | Hull et al. | 395/600 |

*Primary Examiner*—Gail O. Hayes
*Assistant Examiner*—Frantzy Poinvil
*Attorney, Agent, or Firm*—Brooks & Kushman P.C.

[57] ABSTRACT

A method and system for matching textual strings representing customer names/addresses is disclosed. The textual strings are first transformed by a plurality of predefined filters. The transformed textual strings are then compared utilizing a plurality of predefined comparators to determine if the two transformed textual strings match. A score is determined based on the comparison of the two transformed textual strings utilizing a scoring procedure. Based on the score and a matching procedure, it is determined whether or not the textual strings match.

14 Claims, 3 Drawing Sheets

METHOD AND SYSTEM FOR MATCHING NAMES AND ADDRESSES

TECHNICAL FIELD

This invention relates generally to matching textual strings. In particular, this invention relates to a method and system for matching names/addresses utilizing several predefined filters and comparators.

BACKGROUND ART

When a customer-oriented entity loads customer information into a database, the need arises to test whether or not the newly entered customer name and address matches a customer name/address already in the database. The operator of the database may spell the customer's name and/or address slightly different from how it is stored in the database, such as, for example, "Mark" versus "Marc".

As a result, a matching routine for textual strings representing a name and/or address is required that can determine if a match exists even in the presence of noise and variation, such as a space or an unnecessary punctuation mark.

Known methods are available for textual string matching. For example, the soundex method reduces the impact of variation in spelling by encoding names according to their pronunciations. Similarly, the trigram technique approaches the problem by computing overlapping consecutive three-letter groups.

Each of these methods work well when applied to the kind of noise/variation it was intended to handle. However, there exists a need for a more efficient technique for obtaining the most desirable match between two textual strings containing several different kinds of noises/variations.

DISCLOSURE OF THE INVENTION

It is thus a general object of the present invention to provide a method and system for matching textual strings consisting of at least one component representing a customer name and/or customer address.

It is another object of the present invention to provide a method and system for matching customer names irrespective of the order in which the components are written.

It is yet another object of the present invention to provide a method and system for matching customer addresses based on the predetermined importance of each of the components of the address.

In carrying out the above objects, a method is provided for determining if two textual strings match. The method begins with the step of transforming the two textual strings utilizing a plurality of predefined filters.

The method continues with the step of comparing the components of the transformed textual strings utilizing a plurality of predefined comparators to determine if the two transformed textual strings match.

The method also includes the step of determining a score based on the comparison of the transformed textual strings utilizing a scoring procedure.

Finally, the method concludes with the step of determining if a match between the two textual strings exists based on the score and a matching procedure.

In further carrying out the above object and other objects of the present invention, a system is also provided for carrying out the steps of the above described method.

The system includes a transformer for transforming the two textual strings utilizing a plurality of predefined filters.

The system also includes a collator for comparing the transformed textual strings utilizing a plurality of predefined comparators to determine if the two transformed textual strings match.

The system further includes a determining means for determining a score based on the comparison of the transformed textual strings utilizing a scoring procedure.

Finally, the system includes a matcher for determining if a match between the two textual strings exists based on the score and a matching procedure.

The above objects, features and advantages of the present invention, as well as others, are readily apparent from the following detailed description of the best mode for carrying out the invention when taken in connection with the accompanying drawings.

BRIEF DESCRIPTION OF THE DRAWINGS

The present invention will be apparent from the detailed description taken in conjunction with the accompanying drawings in which.

BEST MODE FOR CARRYING OUT THE INVENTION

Figure 1:
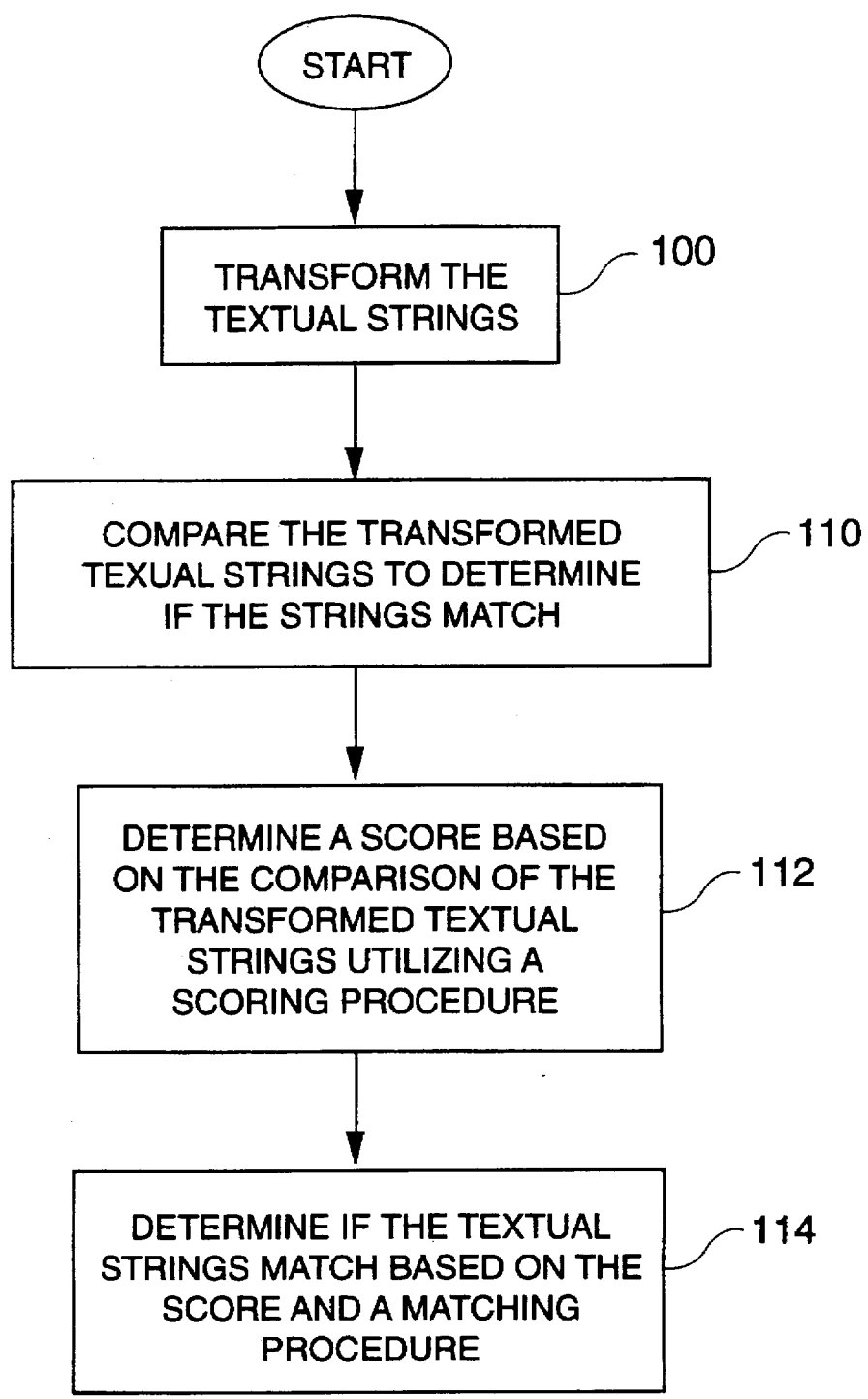
FIG. 1 is a flow chart illustrating the general sequence of steps associated with the operation of the present invention.

Referring now to the drawings, FIG. 1 illustrates the method of the present invention. The method begins with the step of transforming the textual strings as shown by block 100. This step is accomplished utilizing a plurality of predefined filters.

The filters transform the textual strings in many ways. For example, a "remover" filter may eliminate non-alphanumeric symbols, such as punctuation marks or multiple spaces. A "breaker" filter may also break a textual string into words according to certain delimiters. An "excluder" filter transforms the textual strings by excluding words with only one or two characters.

Next, block 110 illustrates the second step of the method, comparing the transformed textual strings to determine if the textual strings match, i.e., whether or not two customer names or customer addresses are the same. This step is accomplished utilizing a plurality of predefined comparators capable of comparing two textual strings and determining if the strings match according to each comparator's predetermined matching system.

The comparators compare the textual strings utilizing many techniques. For example, a "soundex" comparator determines that a match is found between two textual strings if they sound the same. An "edit delta" comparator determines whether or not a match is found based on the number of edits made, such as, for example, providing a single insert or a single deletion or transposing two letters, to convert one textual string into the other textual string. A "trigram comparator", on the other hand, determines whether or not a match exists based on the number of trigrams (i.e., three common consecutive letter groups) that are common in the two textual strings.

If the textual strings represent a customer name, each component of one of the transformed textual string is compared to each component of the other transformed textual string. This results in pairs of compared components. For example, one textual string may be "Marc A. Smythe" and a second textual string may be "Mark Smithe". In this case, "Marc" is first compared to "Mark" and then "Marc" is compared to "Smithe"; "A" is compared to "Mark" and "Smithe"; and "Smythe" is compared to "Mark" and "Smithe".

Upon applying the comparators to each pair of components of the textual strings, a scoring matrix is formed. For example, if one of the textual strings contains N1 components, n(1,1), n(1,2), n(1,3) . . . , n(1,N1), and the other textual string contains N2 components, n(2,1), n(2,2), n(2,3), . . . , n(2,N2), the scoring matrix is as follows:

|        | n[2,1]  | n[2,2]  | ... | n[2,N2]  |
|--------|---------|---------|-----|----------|
| n[1,1] | p[1,1]  | p[1,2]  | ... | p[1,N2]  |
| n[1,2] | p[2,1]  | p[2,2]  | ... | p[2,N2]  |
| .      |         |         |     |          |
| .      |         |         |     |          |
| .      |         |         |     |          |
| n[1,N1]| p[N1,1] | p[N1,2] |     | p[N1,N2] | where each p[i,j]= min { p | p is penalty by an algorithm }

If the textual string represents a customer address, each component of one of the textual strings is compared to a corresponding component of the other textual string. For example, one textual string may be "1234 Arapaho Road, Room 101, Boulder, Colo." and a second textual string may be "1234 Arapaho, Apt. 101, Boulder, Colo.". In this case, street number "1234" is compared to street number "1234", respectively. Also, street name "Arapaho" is compared to street name "Arapaho", respectively. The thoroughfare code "Road" is compared to nothing in the second textual string resulting in no match. And the rest of the components are compared to their corresponding components.

As shown by block 112, the method next includes the step of determining a penalty score based on the comparison of the transformed textual strings. This step is accomplished utilizing a scoring procedure.

As each individual comparator may have its own measurement system for determining the similarity between two strings, a common scoring procedure is necessary to provide a unified penalty score. The common scoring procedure is also necessary to determine a minimal penalty score among the penalty scores given by each individual comparator as a result of determining the degree of similarity between the two textual strings.

Finally, as shown by block 114, the method includes the step of determining if the two textual strings match based on the score determined in block 112 and a matching procedure. The matching procedure synthesizes individual scores and computes a composite score based on various information, including the number of components in each textual string, the number of components that are different between the two textual strings, and the maximal penalty score among the component penalties.

Figure 2:
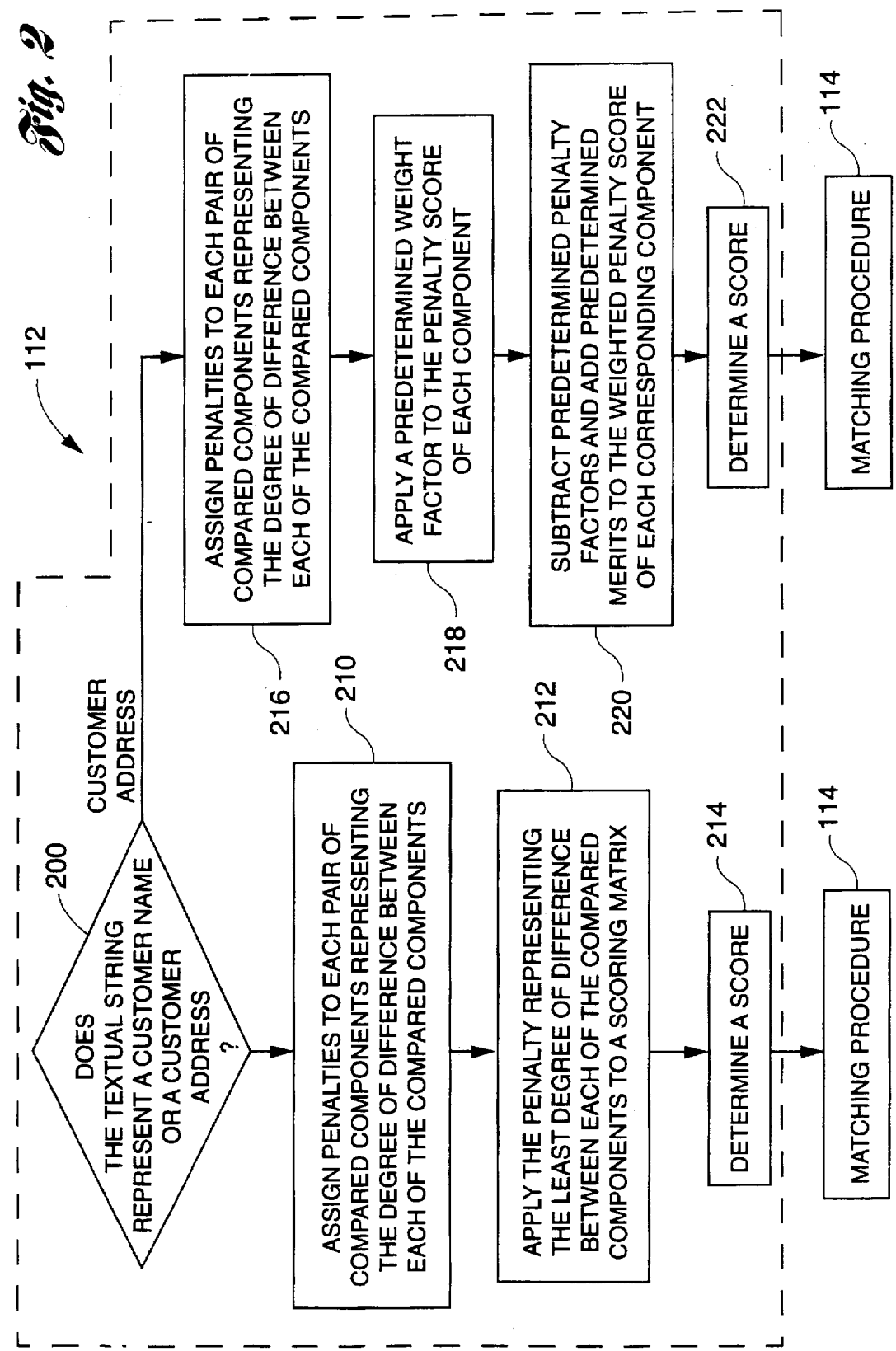
FIG. 2 is a flow chart illustrating the general sequence of steps associated with the scoring procedure of the present invention.

The general sequence of steps associated with the scoring procedure utilized in block 112 is shown in the flow chart of FIG. 2. The scoring procedure begins with the step of determining if the textual strings represent a customer name or a customer address as shown by conditional block 200.

If the textual strings represent a customer name, penalties are assigned to each pair of the compared components representing the degree of difference between each of the compared components, as shown by block 210. Each of the plurality of predefined comparators has its own penalty assessing system. For example, given "MARK" and "MARC", the "soundex" comparator would find the two identical, whereas the "edit delta" comparator would find there is a difference of one edit between the two names.

Next, the penalty representing the least degree of difference among those given by the individual comparators between each pair of compared components is utilized to construct the scoring matrix, as shown by block 212. The scoring matrix represents the comparison between each of the components of one of the transformed textual strings compared to each of the components of the other transformed textual string. Using the above customer name example, a scoring matrix may look like the following:

|        | Marc           | A.             | Smythe         |
|--------|----------------|----------------|----------------|
| Mark   | 0 (soundex)    | 4 (edit delta) | 5 (edit delta) |
| Smithe | 6 (edit delta) | 6 (edit delta) | 0 (soundex)    |

The scoring matrix is then examined, and it is determined that "MARK" should be matched against "MARC" since this pair resulted in the least degree of difference. Similarly, "SMITHE" should be matched against "SMYTHE".

Finally, as shown by block 214, an overall score is determined utilizing the following equation:

```
if P = 1
   if (N1 = N2)
       N1 = N1 + 10
       N2 = N2 + 10
   endif
   N1 / (N2+N0) * 100
else
   (N1−N0) / (N2−N0) * 100
endif
``` where N1 is the number of components in the shorter name and N2 is the number of components in the longer name. N0 is the number of components that are different between the two names. P is the maximum penalty of the matched components. In the example above, P=0 ("MARK" vs. "MARC"=0 and "SMITHE" vs. "SMYTHE"=0). Therefore, the overall score is computed as follows:

$$\frac{2-0}{3-0} \times 100 = 67\%$$

If the textual strings represent a customer address, penalties are assigned to each pair of compared components representing the degree of difference between each of the compared components, as shown in block 216.

Next, as shown by block 218, a predetermined weight factor is applied to each component of the address. The weight factor represents the importance of each of the components. For example, the street name may have more importance than the thoroughfare code and, hence; a higher weight factor, "50%" vs. "5%", respectively.

Additional penalties or merits can also be associated with component pairs based on the absence or presence of predetermined address components, as shown by block 220. For example, a penalty can be assigned to an address component if it is present in one of the textual strings, but absent from the other textual string. In addition, a penalty can be assigned to an address component if it is missing from both textual strings. In contrast, a merit can be assigned to an address component if it is present in both textual strings.

And finally, as shown by block 222, a final score for each compared component is obtained based on the applied weight factors and the penalty and merit factors. For example, a final score for the street name having a penalty score Ms would be computed as follows:

Final Score=(Ms×Weight Factor)+merit−penalty.

Figure 3:
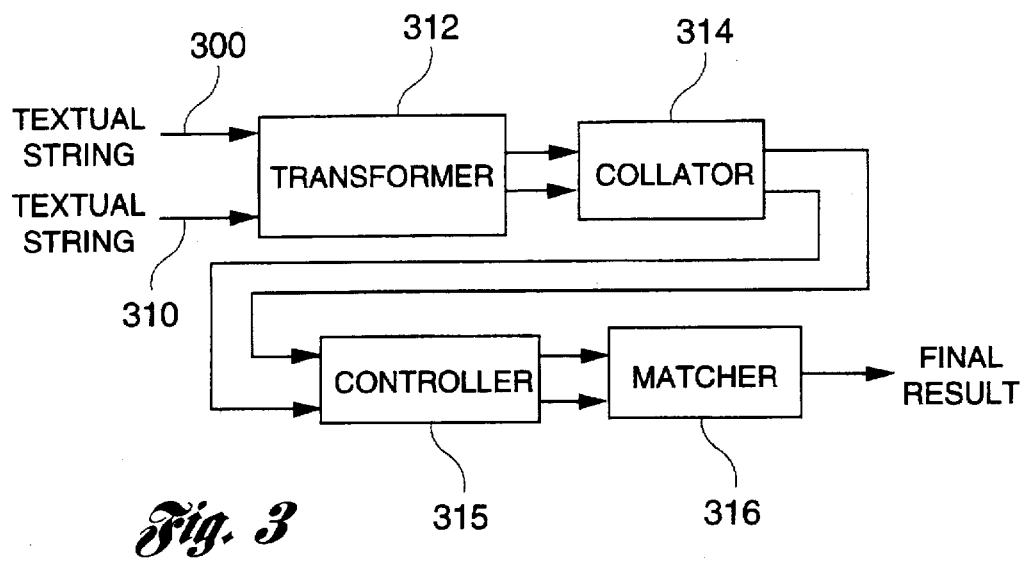
FIG. 3 is a block diagram of the preferred embodiment of the present invention.

Referring now to FIG. 3, a block diagram of the preferred embodiment of the present invention is shown. Two textual strings 300, 310 are transformed via a transformer 312. A collator 314 is used to compare the transformed textual strings 300, 310 to determine if the textual strings 300, 310 match each other.

A controller 315 is provided for determining a score based on the comparison of the transformed textual strings utilizing a scoring procedure.

A matcher 316 is then used to determine if the two textual strings match each other. The marcher 316 determines whether or not there is a match based on a score and a matching procedure. The score is based on the comparison of the transformed textual strings performed by the collator 314 utilizing a scoring procedure.

Figure 4:
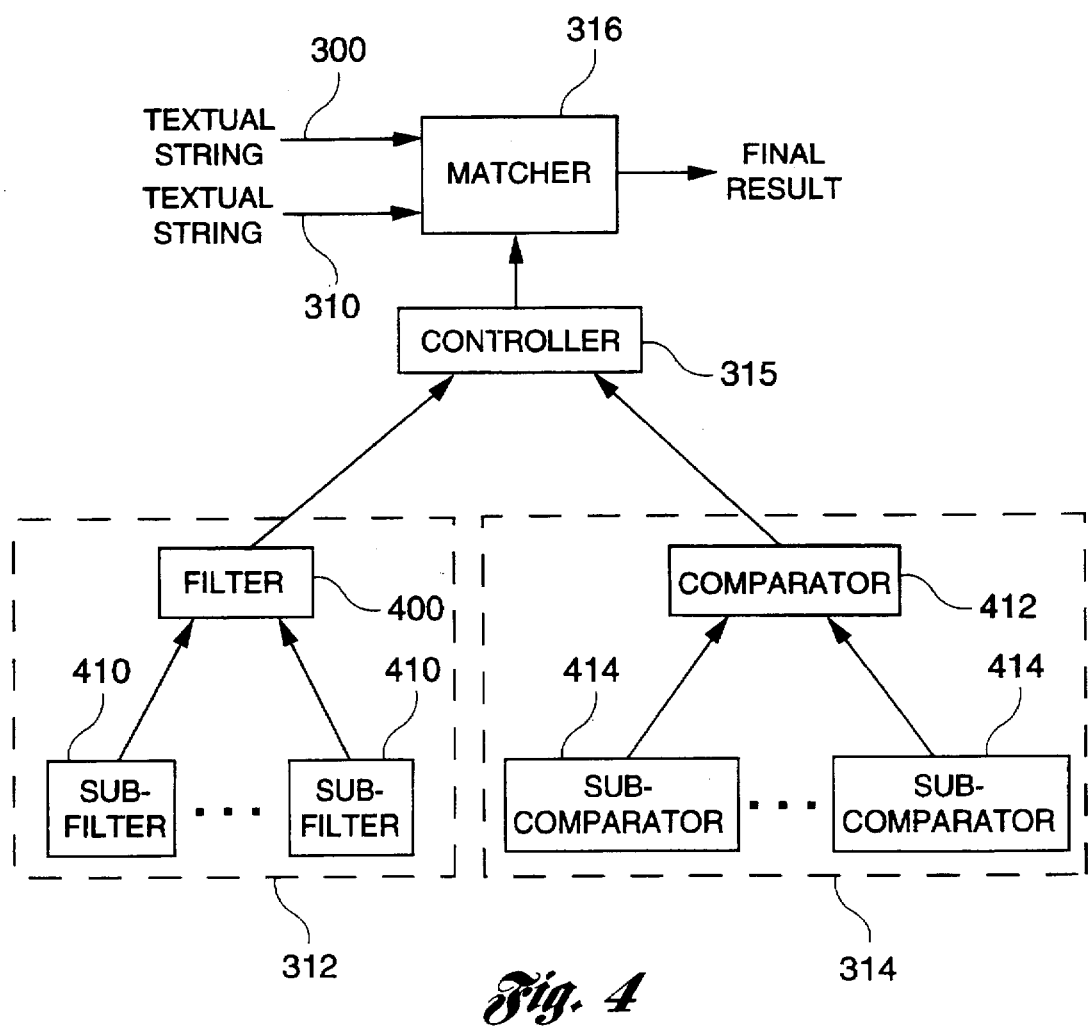
FIG. 4 is a block diagram of one embodiment of the present invention made in accordance with the teachings of the preferred embodiment of this invention.

FIG. 4 is a block diagram of one embodiment of the present invention made in accordance with the teachings of the preferred embodiment of this invention utilizing object-oriented technology. Object-oriented technology provides a flexible framework for general string matching. Within this framework, the transformer 312 and the collator 314 are implemented as objects. An object is a collection of related procedures and data. Objects can be defined and maintained independently of one another, with each object forming a neat, self-contained universe.

In accordance with the present invention, the transformer 312 is defined as an object belonging to a class referred to as a filter 400. A class defines the methods and variables to be included in a particular type of object. The filter 400 is used to perform string transformations.

The filter 400 is comprised of several sub-filters 410. The sub-filters 410 are often referred to as subclasses since they define their own methods and variables. The sub-filters 410 may be in the form of a "remover", "breaker", and/or "excluder" filter, as described above.

Similarly, the collator 314 is defined as an object belonging to a class referred to as a comparator 412. The comparator 412 is used to compare two textual strings and determine whether or not they are the same.

The comparator 412 is comprised of several sub-comparators 414 that apply different techniques in determining whether or not two strings match. The sub-comparators 414 may be in the form of a "soundex", "edit delta", and/or "trigram" comparator, as described above.

The controller 315 is the object that ties the filter 400 and the comparator 412 together, providing the needed integration framework. The controller 315 first applies the filter 400 to the textual strings 300, 310. The textual strings 300, 310 are transformed by each of the sub-filters 410.

Next, the controller 315 applies the comparator 412 to the transformed textual strings 300, 310. The transformed textual strings 300, 310 are compared to each other via each sub-comparator 414. Each sub-comparator 414 has its own way of matching two strings. In addition, each sub-comparator 414 may produce a different result. One sub-comparator 414 may determine that the textual strings 300, 310 match, while a second sub-comparator 414 may determine that the two textual strings 300, 310 do not match.

In accordance with the present invention, each sub-comparator 414 converts its result, i.e., match or no match, into a common scoring system utilizing a scoring procedure, as described above.

Finally, the matcher 316 utilizes the score received by the controller 315 and a matching procedure, described above, to determine if a match between the two textual strings 300, 310 exist.

While the best modes for carrying out the invention have been described in detail, those familiar with the art to which this invention relates will recognize various alternative designs and embodiments for practicing the invention as defined by the following claims.

What is claimed is:

1. A computerized method for determining if a first textual string corresponds to a second textual string stored in a database, the method comprising:

receiving the first textual string;

retrieving the second textual string from the database;

transforming each of the first and second textual strings into a plurality of components based on a plurality of predefined filters;

comparing the plurality of components of the first transformed textual string to the plurality of components of the second transformed textual string utilizing a plurality of predefined comparison algorithms to obtain a plurality of differences between each pair of compared components;

generating a scoring matrix including a penalty for each of the compared components representing a least degree of difference among the plurality of differences determined by each of the plurality of comparison algorithms; and generating a match signal indicating the first textual string corresponds to the second textual string based on the scoring matrix.

2. The method of claim 1 wherein the step of comparing includes the step of comparing each of the plurality of components of the first transformed textual string with each of the plurality of components of the second transformed textual string to obtain the plurality of compared components.

3. The method of claim 1 wherein the step of comparing includes the step of comparing each of the plurality of components of the first transformed textual string with a corresponding component of the plurality of components of the second transformed textual string.

4. The method of claim 3 wherein the step of generating the scoring matrix comprises the steps of:

applying a predetermined weight factor to the penalty of each of the compared components representing the relative importance of each of the components;

applying a predetermined penalty or merit factor to the penalty of each of the compared components based on the absence or presence of predetermined components, respectively; and determining a score based on the weight, penalty and merit factors.

5. The method of claim 1 wherein the step of transforming includes the step of eliminating non-alphanumerical words or symbols from the first and second textual strings.

6. The method of claim 1 wherein the step of transforming includes the step of breaking the first and second textual strings according to predetermined delimiters.

7. The method of claim 1 wherein the step of transforming includes the step of excluding components having only one or two characters.

8. The method of claim 1 wherein the step of comparing includes the step of determining if the first and second textual strings sound alike.

9. The method of claim 1 wherein the step of comparing includes the step of determining a number of edits made to convert the first textual string into the second textual string.

10. The method of claim 1 wherein the step of comparing includes the step of determining if three consecutive letters or symbols are common in each of the components of the first and second textual strings.

11. A computerized system for determining if a first textual string corresponds to a second textual string stored in a database, the computerized system comprising:

a transformer for transforming each of the first and second textual strings into a plurality of components based on a plurality of predefined filters;

means for receiving the first textual string;

means for retrieving the second textual string from the database;

a comparator for comparing the plurality of components of the first transformed textual string to the plurality of components of the second transformed textual string utilizing a plurality of predefined comparison algorithms to obtain a plurality of differences between each pair of compared components;

a controller for generating a scoring matrix including a penalty for each of the compared components representing a least degree of difference among the plurality of differences determined by each of the plurality of comparison algorithms; and a matcher for generating a match signal indicating the first textual string corresponds to the second textual string based on the scoring matrix.

12. The system of claim 11 wherein the transformer is implemented as a filter object.

13. The system of claim 11 wherein the comparator is implemented as a comparator object.

14. The system of claim 13 wherein the plurality of predefined comparison algorithms are implemented as subclasses of the comparator object.

* * * * *